(No Model.)
E. L. HENINGTON.
Coffee Pulper and Separator.
No. 232,714. Patented Sept. 28, 1880.
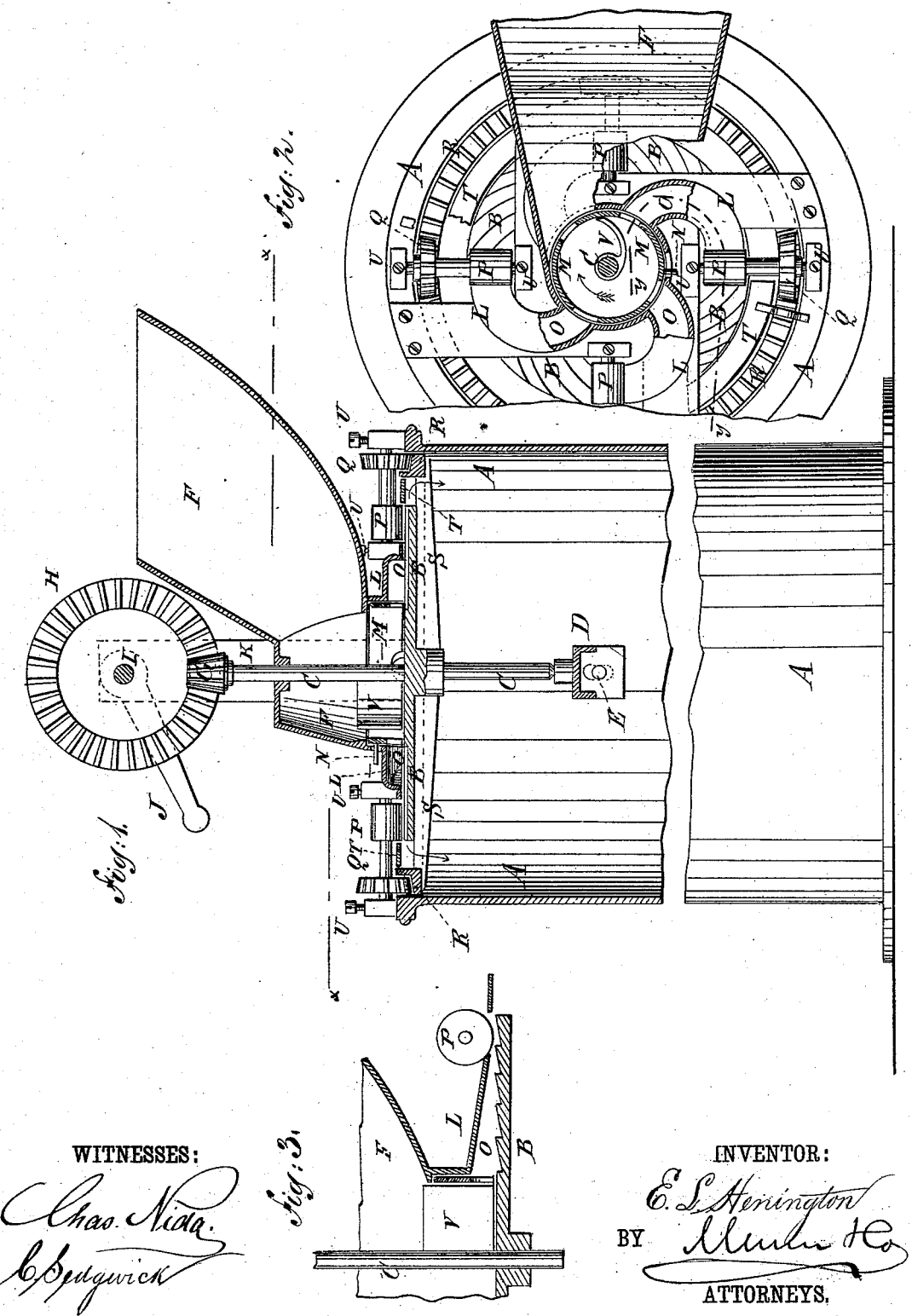
WITNESSES:
Chas. Nida
C. Sedgwick
INVENTOR:
E. L. Henington
BY
ATTORNEYS.

UNITED STATES PATENT OFFICE.

EDWIN L. HENINGTON, OF SANTAREN, PARA, BRAZIL.

COFFEE PULPER AND SEPARATOR.

SPECIFICATION forming part of Letters Patent No. 232,714, dated September 28, 1880.

Application filed July 20, 1880. (No model.)

*To all whom it may concern:*

Be it known that I, EDWIN LANE HENINGTON, of Santaren, Province of Para, Empire of Brazil, have invented a new and useful Improvement in Coffee Pulpers and Separators, of which the following is a specification.

Figure 1 is a sectional elevation of the improvement. Fig. 2 is a sectional plan view taken through the line $x\ x$, Fig. 1. Fig. 3 is a sectional elevation taken through the line $y\ y$, Fig. 2.

Similar letters of reference indicate corresponding parts.

The object of this invention is to furnish simple and convenient machines for removing and separating the pulp from the berries or kernels of the coffee fruit in an expeditious and effective manner.

The invention consists in constructing a coffee pulper and separator of the cylindrical case, the wheel or disk, the spindle having a wing for discharging the fruit and a driving-gearing, the hopper having an adjustable collar for regulating the discharge, the plate having curved channels for conducting the fruit to the rollers, the rollers for removing the pulp, and the gearing for driving the rollers, all constructed and operating as will be hereinafter fully described.

A represents a cylindrical case or vessel, open at top and bottom, and of a convenient size and height.

B represents a wheel or disk placed within the upper end of the cylinder A, and made of a less diameter than the said cylinder, so as to leave sufficient space between the edge of the said disk or wheel and the inner surface of the cylinder A for the coffee berries or kernels to drop through. The upper side of the disk or wheel B is roughened or has teeth or a dress formed upon it to take hold of the pulp of the coffee fruit in removing it, as will be hereinafter fully described. The hub of the wheel or disk B is attached to a vertical shaft or spindle, C, the lower end of which revolves in a step attached to or formed upon the center of a cross-bar, D.

The ends of the cross-bar D rest against the opposite sides of the cylinder A, and are secured to the said cylinder by bolts E, which pass through short vertical slots in sides of the cylinder A, so that the bar D can be adjusted to take up the wear and can be detached when desired.

The upper part of the spindle C revolves in bearings in the top of the lower part of the hopper F, and to its upper end is attached a small beveled-gear wheel, G, the teeth of which mesh into the teeth of a large beveled-gear wheel, H, attached to the shaft I.

The shaft I has a crank, J, attached to its end, and revolves in bearings in supports K, attached to the lower part of the hopper F.

The hopper F is attached to and supported by the plate L, which has four or more arms formed upon it, and extending out to the upper edge of the cylinder A, to which they are securely bolted. The lower part of the hopper F is cylindrical in form, and has four or more holes formed through it of sufficient size to allow the coffee fruit to pass through. The size of the discharge-openings of the hopper F is regulated by a collar, M, fitted to the inner side of the lower part of the hopper and having corresponding openings formed through it.

The collar M is adjusted by a pin, N, attached to it, and which passes through a slot in the said lower part of the hopper F.

The plate L is struck up from the lower side to form curved channels O, leading from the discharge-openings of the hopper F to the outer part of the wheel or disk B, as shown in Fig. 2.

At the outer ends of the curved channels O are placed small rollers P, the inner journals of which revolve in bearings attached to the plate L. The rollers P are placed radially, and their outer journals revolve in bearings attached to the upper edge of the cylinder A.

To the outer journals of the rollers P are attached gear-wheels Q, the teeth of which mesh into the teeth of the gear-wheel R, connected with the wheel or disk B by the arms S, so that the gear-wheel R may be carried around by and with the wheel B in its revolution, and thus revolve the rollers P.

The space between the wheel or disk B and the gear-wheel R is covered with a plate, T, for the pulp to pass over as it escapes from the machine.

The rollers P are adjusted closer to or farther from the wheel B by set-screws U, which pass in through the bearings of the said rollers.

To the spindle C, within the lower part of the hopper F, is attached a wing, V, to push the coffee fruit out through the discharge-holes of the said hopper.

As the machine is operated the coffee fruit passes through the channels O to the rear sides of the rollers P, where the pulp of the fruit is caught between the rollers P and the wheel or disk B, and is drawn off the berries or kernels. The said berries or kernels, being too large to pass between the said wheel and rollers, are made to move outward along the rear sides of the rollers and drop through the openings in the plates T into the interior of the cylinder A. The pulp, as it escapes from the rollers P, is driven outward by centrifugal force and drops to the floor outside of the cylinder. When a sufficient quantity of fruit has been operated upon the pulp around the cylinder A is swept or shoveled back and the cylinder A is lifted and set to one side, leaving the berries or kernels in a heap upon the floor ready to be prepared for market.

The machine may be operated by hand, by animal-power, by steam-power, or by any other convenient power.

Having thus described my invention, what I claim as new, and desire to secure by Letters Patent, is—

1. A coffee pulper and separator constructed substantially as herein shown and described, consisting of the cylindrical case A, the wheel B, spindle C, having wing V, and driving-gearing G H, the hopper F, having adjustable collar M, the plate L, having curved channels O upon its under side, and the rollers P and their driving-gearing Q R, as set forth.

2. In a coffee pulper and separator, the combination, with the cylindrical case A, of the wheel and spindle B C and their driving-gearing, the hopper F, the plate L, having curved channels O, and the rollers P and their driving-gearing, substantially as herein shown and described, whereby the pulp of coffee fruit is removed and separated from the berries or kernels, as set forth.

EDWIN L. HENINGTON.

Witnesses:
JAMES T. GRAHAM,
C. SEDGWICK.